(No Model.)
T. L. RANKIN.
Water Tank for Ice Making Apparatus.
No. 235,813. Patented Dec. 21, 1880.
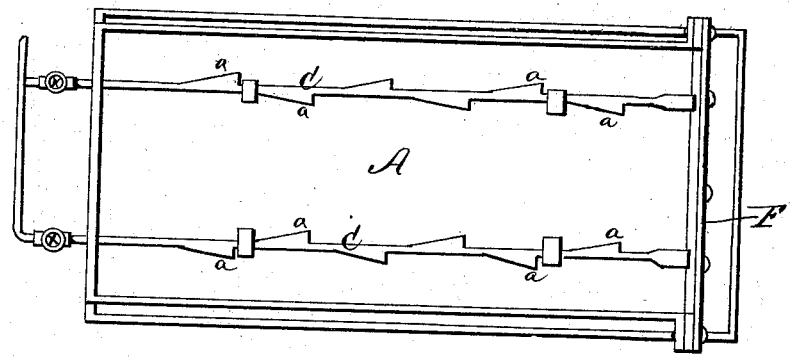
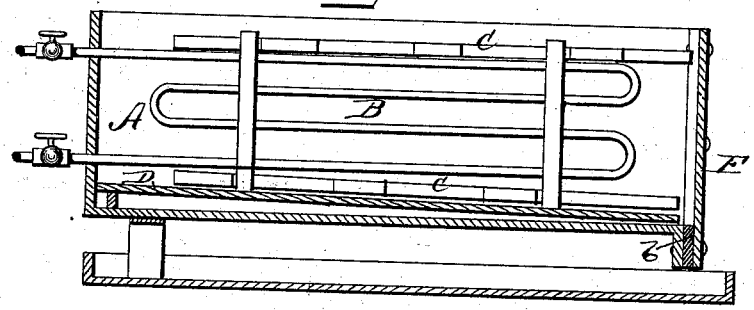
Witnesses:
W. C. McArthur
Jos. M. Madigan
Inventor.
Thos. L. Rankin
per T. J. Alexander
Attorney.

UNITED STATES PATENT OFFICE.

THOMAS L. RANKIN, OF NEW YORK, N. Y.

WATER-TANK FOR ICE-MAKING APPARATUS.

SPECIFICATION forming part of Letters Patent No. 235,813, dated December 21, 1880.

Application filed April 22, 1880. (No model.)

*To all whom it may concern:*

Be it known that I, THOMAS L. RANKIN, of New York, in the county of New York and State of New York, have invented certain new and useful Improvements in Water-Tanks for Ice-Machines; and I do hereby declare that the following is a full, clear, and exact description thereof, reference being had to the accompanying drawings, and to the letters of reference marked thereon, which form part of this specification.

My invention relates to machines for the manufacture of artificial ice; and it consists in the construction of the water-tank and the means for breaking and discharging the cakes of ice, as will be hereinafter more fully set forth.

In order to enable others skilled in the art to which my invention appertains to make and use the same, I will now proceed to describe its construction and operation, referring to the annexed drawings, in which—

Figure 1 is a plan view, and Fig. 2 is a central vertical section.

A represents a water-tank, provided with one or more pipe-coils, B, through which gas is expanded or non-congealable liquids at low temperature are forced for freezing the water in any of the known and usual ways for the manufacture of artificial ice. Each freezing-coil is arranged in a vertical frame, and in each of these frames are one or more horizontal movable bars, C, provided with a series of wedge-shaped protuberances, *a a*, arranged alternately on opposite sides, each bar resting on one length of pipe, as shown.

When the vertical cake of ice is frozen and the gas or liquid allowed to give off heat instead of absorbing the same, the pipes are thawed loose. The bars C, carrying the wedges *a*, being in contact with the pipes, are also detached from the ice, and the bars are then driven forward in the direction of the small edges or ends of the wedges, and the cake of ice is thereby opened in a line with the pipes and wedges, and the two parts of the cake of ice are spread apart sufficiently to clear the bars or frame which supports the coil. The floor D of the tank inclines toward the removable door F, allowing the cakes to be easily slid out. The door F is bolted up against packing *b*, of rubber or any convenient yielding substance.

By this arrangement cakes of ice of very large size can be made and easily handled, to be afterward sawed or broken into blocks of any size desired.

Clear ice can be made, as the cakes are not allowed to freeze until they fill the spaces between them.

The process of freezing is substantially the same as that described in other patents granted to me, and does not need any description here.

Having thus fully described my invention, what I claim as new, and desire to secure by Letters Patent, is—

1. In a water-tank for ice-machines, containing one or more coils of pipes in vertical position, one or more horizontally-movable bars provided with wedges or wedge-shaped projections on each side, substantially as and for the purposes herein set forth.

2. The combination of the tank A, inclined floor D, door F, one or more pipe-coils, B, and one or more bars, C, with side wedges, *a*, all constructed substantially as and for the purposes herein set forth.

In testimony that I claim the foregoing as my own I affix my signature in presence of two witnesses.

THOS. L. RANKIN.

Witnesses:
J. G. COCKRILL,
GEO. W. GATES.